POROUS BACKING
PATTERNED SPREAD OF ADHESIVE

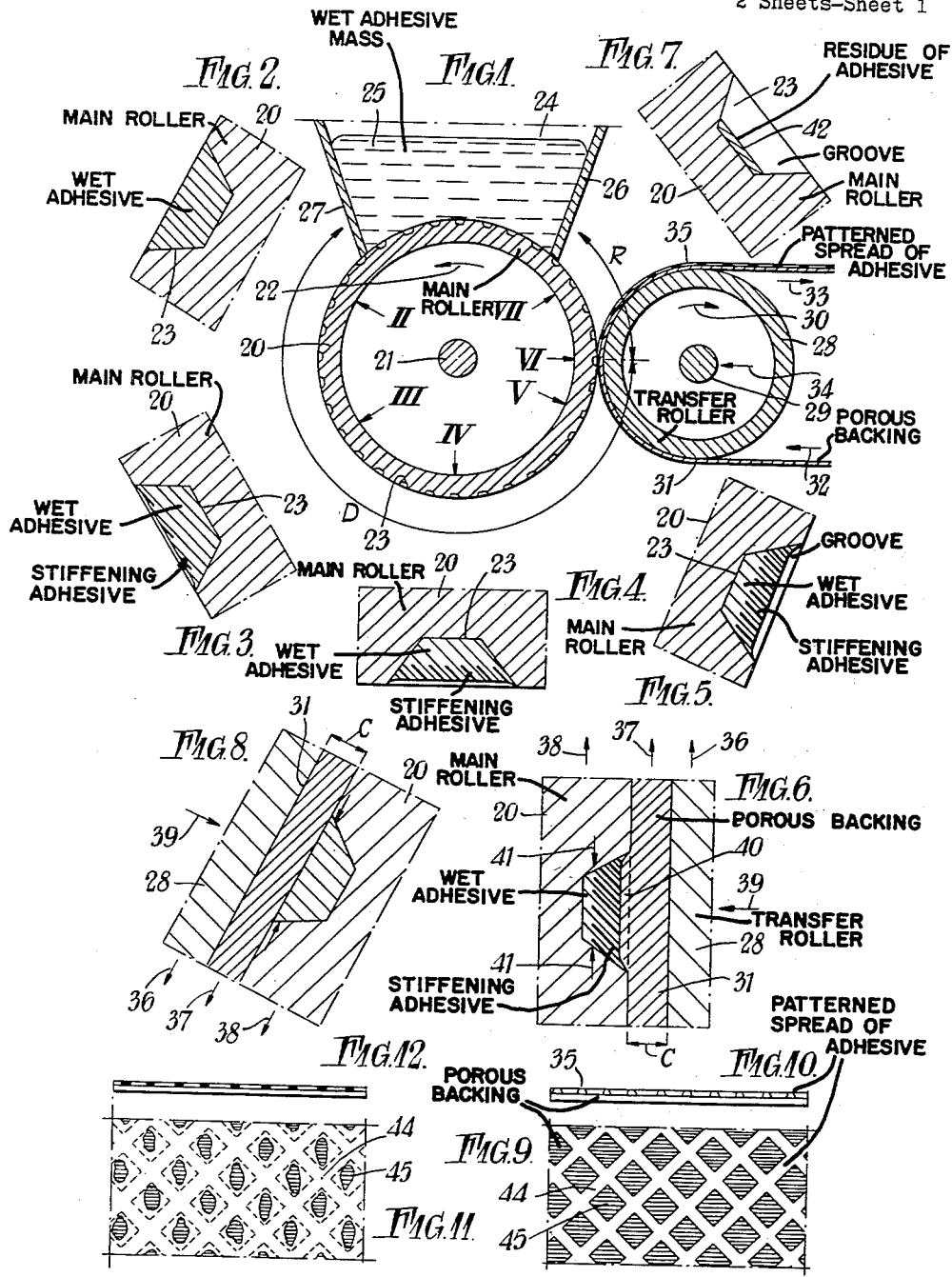

43
MEDICATED DRESSING

43

MEDICATED PAD

MEDICATED PAD

46

… … …

United States Patent Office 2,940,868
Patented June 14, 1960

2,940,868

ADHESIVE MEDICAL AND SURGICAL DRESSINGS

Albert George Patchell, Welwyn Garden City, England, assignor to T. J. Smith & Nephew Limited, Yorkshire, England, a British company Filed May 16, 1956, Ser. No. 585,257

Claims priority, application Great Britain May 26, 1955

5 Claims. (Cl. 117—38)

This invention relates to adhesive medical and surgical dressings of the type comprising a backing which is porous, which latter term must be regarded herein as extending from the highly porous to the micro-porous, coated on one side with a patterned spread of pressure-sensitive rubber based adhesive sufficient upon application to give adequate adhesion to the skin but leaving a multiplicity of small uncoated areas for the escape of perspiration to constitute a wholly porous dressing.

Attempts have been made to transfer a pattern of solvent-thinned pressure sensitive rubber based adhesive directly to a backing by a process utilising a grooved roller as a feeding carrier for the adhesive and to some extent resembling "intaglio" printing, but these have failed owing to the characteristics of the pressure-sensitive adhesive masses.

When the mass is "wet," that is when it contains a relatively high proportion of solvent, the amount of adhesive transferred from the feeding carrier to the backing is small and insufficient to give adequate adhesion to the skin. If, however, a stiffer, more cohesive adhesive mass containing a relatively low proportion of solvent is used, the patterned adhesive mass tends to remain adherent to the feeding carrier and excessive stretching or "stringing" of said mass occurs at the transfer position between the carrier and the backing, which is of such extent that hitherto the desired result has not been attained.

According to the present invention, a method of applying a patterned spread of solvent-thinned pressure sensitive rubber based adhesive to the porous backing comprises utilising as a carrier for the patterned adhesive mass, a slowly turning main roller of metal or other suitable material, for example a plastic material such as polythene, the cylindrical curved surface of which has cut thereon shallow grooves which may cross as desired, the uncut portions of the surface being a defined proportion of the total surface and the uncut and grooved portions being distributed in a uniform manner over the curved surface, to which grooves, while the roller is turning, the adhesive mass in a relatively wet state, is supplied at one circumferential zone, the charged grooves then passing on at what is herein described as a slow rate through a large angular distance, preferably greater than 180°, to the position where it is transferred under slight pressure to the porous backing, during which period the solvent of that part of the adhesive mass in the grooves located at the exposed surface of such mass and to some extent down into its thickness, evaporates to change the state of this outer part of the thickness of the adhesive mass from the wet state of low cohesiveness to the stiffer readily adhesive and more cohesive condition whilst leaving the remaining portion of the thickness of the mass at and towards the base of the grooves still in the wet state of low cohesivesness upon reaching the transfer position, where the porous backing passing around a transfer roller having the same surface speed as the main roller, but opposite direction of rotation, is pressed against the main roller by the transfer roller to cause the exposed adhesive surface of the patterned adhesive and cohesive mass in the outer part of the grooves to adhere to the applied surface of the porous backing and effect, by the continued turning of the main and transfer rollers, the ready transfer of the patterned adhesive mass to the porous backing without excessive stringing, as the stiffer readily adhesive and more cohesive mass readily separates from the wet adhesive mass of lower cohesion located at and towards the base of the grooves, to leave a certain amount of this wet adhesive mass of lower cohesion at the base of the grooves, which then return through a minimum angular distance to the supply zone for re-filling and repetition of the cycle.

Whatever the exact dimensions of the parts and their arrangement, the speed of operation can be adjusted so that by the time the surface of the main roller having the filled grooves comes into contact with the porous backing to be spread, the greater part of the adhesive mass in the grooves has been conditioned to acquire the necessary cohesiveness and surface adhesive strength, to leave the remaining part of the mass at the base of the grooves still in a wet state. The more cohesive portion of the mass adheres to the porous backing with which it is brought into contact and readily separates itself away from the least cohesive wet portion at the base of the grooves without excessive stringing, and it has been found that considerably more than 50% of the patterned mass in the grooves can be transferred in this way.

The slight "stringing" which upon occasion may occur is not detrimental to the result as the "strings" or stretchings of a few stripes of the patterned adhesive mass which may extend at the time of transfer between the main roller and the porous backing, rarely attain a length of say one-half of an inch before they break and have an inappreciable effect on the pattern of pressure-sensitive adhesive spread on the porous backing.

In order that the invention may be better understood, it will now be described with reference to the accompanying drawings which are given by way of example only and in which:

Fig. 1 is a diagrammatic sectional elevation of the relevant portion of one form of apparatus for carrying the method according to the present inventon into effect.

Figs. 2, 3, 4, 5, 6 and 7 are greatly enlarged fragmentary portions of Fig. 1 in the positions indicated by the arrows II, III, IV, V, VI and VII respectively.

Fig. 8 is a view somewhat similar to Fig. 6 but taken in another position.

Fig. 9 shows a plan of a portion of a backing with a patterned spread of an adhesive mass in accordance with the invention located thereon, to a scale larger than that of Fig. 1 but smaller than that of Figs. 2 to 8.

Fig. 10 shows a side elevation of Fig. 9 with the thicknesses greatly exaggerated.

Figs. 11 and 12 are similar views to Figs. 9 and 10, to be hereafter referred to.

Figure 13:
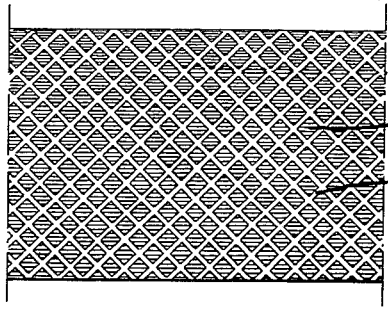
Fig. 13 shows a plan of a portion of a continuous medical and surgical dressing made in accordance with the invention in the form of a continuous band or bandage carrying on one surface the patterned spread of adhesive.

In carrying the invention into effect it should be understood that the porous backing can be of any suitable material as hitherto used for the manufacture of adhesive medical and surgical dressings provided it has a minimum moisture vapour permeability of 2,000 grammes per square metre per 24 hours at 40° C. and with 90% relative humidity. The upper limit depends upon the particular type of dressing to be manufactured. For example, where it need not be resistant to immediate penetration by water or other liquids, there is no real upper limit, but where the upper limit depends upon the ability of the porous backing to resist immediate penetration by water and other liquids, porous backings having a moisture vapour permeability of 5,000 grammes per square metre per 24 hours have been found suitable.

The porous backing can be of any material hitherto used or which is found to be suitable for use with medical and surgical dressings. Thus, it can be a film or thickness of flexible thermoplastic material which is rendered porous in any suitable manner, for example by pricking, punching, or otherwise perforating. In some cases it is made porous or microporous during its manufacture. In this last instance it can, for example, be of the microporous polyvinyl chloride film known under the registered trademark Porvic. In other cases it can be rendered porous by "foaming." Obviously, it also can be formed from a suitable woven or other textile fabric.

Any solvent-thinned pressure sensitive rubber based adhesive suitable for medical and surgical dressings can be used. Amongst others, the following is a suitable composition for such an adhesive mass:

| | Parts by weight |
|---|---|
| Crepe rubber | 100 |
| Zinc oxide | 105 |
| Liquid paraffin | 26 |
| Wool fat | 58 |
| Colophony resin | 127 |
| Antioxidants, etc | 1 |

Dissolved in a petroleum spirit to give about 50% solids content by weight.

The above composition in the 50% by weight of petroleum spirit is an example of the adhesive mass in what have been termed the "wet" state of low cohesiveness.

In the particular method of carrying the invention into effect shown in Fig. 1, 20 is the main roller of steel which in a practical embodiment has a diameter of slightly more than 3". This is mounted on a shaft 21 which is driven in the direction of the arrow 22. The roller is of desired axial length and from end to end has cut on its curved surface multi-start left-hand and right-hand helical grooves 23 located at 45° to the axis, which cross on said surface. In the practical embodiment, the grooves are 0.022" deep bevelled at the sides, 0.036" wide at the surface, 0.015" wide at the base, and spaced apart with a pitch of 0.100".

24 is a hopper for the solvent-based adhesive mass 25 in the "wet" state, which is bounded circumferentially of the roller 20 by doctor blades 26 and 27 the lower ends of which include 90° of the circumference of the main roller 20 between them.

In the rotation of the main roller 20 the filled grooves 23 emerging from under the doctor blade 27 travel through the distance represented by the dimension D and which extends some 225° of the circumference of the said roller to attain the transfer position. From this position, having had transferred therefrom the majority of the adhesive mass contained therein, they travel through the distance represented by the dimension R and which extends some 45° of the circumference of the main roller, to pass under the doctor blade 26 to the interior of the hopper 24 for re-filling.

28 is a transfer roller which is preferably of a resilient material, for example hard rubber, mounted upon a shaft 29 and driven in the direction of the arrow 30 so that it has the same peripheral speed as that of the main roller 20. This transfer roller 28 has passing therearound the porous backing 31 which passes from a bulk roll (not shown) in the direction of the arrow 32 and passes to a drier (not shown) in the direction of the arrow 33. The porous backing 31 is kept pressed into contact with the grooved surface of the main roller 20 by a slight pressure in the direction of the arrow 34 in such a manner that, as hereafter explained, in this, the transfer position, the backing, compressed between the two rollers, projects slightly into the grooves in the actual position of transfer. In Fig. 1 the patterned spread of adhesive indicated by the numeral 35 is shown on the backing which has passed the transfer position and is on its way to the drier.

The operation takes place at room temperature (approximately 20° C.) and in the example under consideration the speed of travel imparted to the backing is approximately 20" per minute, and this also is the speed of drive of the periphery of the main grooved roller 20. From the above it will be appreciated that the filled grooves 23 travel some 6" from the doctor blade 27 to the transfer position and that this movement takes approximately 18 seconds.

It should be emphasized in carrying this method into effect that when a groove 23 first passes from beneath the hopper 24 and, for example, reaches the position shown by the arrow II an enlargement of which is shown in Fig. 2, the said groove is filled with the adhesive mass in its wet state. This is indicated in Fig. 2 by light section lines all of the same thickness.

In passing from the position II to the position III, the outer surface of the adhesive mass, which is a maximum area owing to the bevelling of the sides of the grooves, is exposed to the atmosphere which evaporates the solvent from this surface and to a slight extent down into the thickness of the adhesive mass, and by the consequent slight shrinkage of the mass causes the outer surface thereof slightly to recede from what may be termed the outer plane of the groove. This is indicated in Fig. 3 where the outermost part of the adhesive mass has some thicker section lines included to represent the change of state of this outer portion of the mass in the groove.

Passing on to the position represented by the arrow IV and as exemplified in Fig. 4, here the solvent has been removed to a greater depth of the thickness of the adhesive mass in the groove and the shrinkage also is greater. The increased cohesiveness of the portion of the adhesive mass in the groove coming on the exterior of the said mass and to a still greater extent passing to the interior of this mass, is indicated by the heavier and longer section lines in Fig. 4.

Again, as shown by the arrow V and exemplified in Fig. 5, the shrinkage is still greater and the depth of increased cohesiveness also greater, as indicated by the heavier section lines.

This action continues until the transfer position represented by the arrow VI is reached, an exemplification of which is shown in Fig. 6. In this position, with the operation and apparatus particularly described starting with the composition in the wet state, that is, having 50% by weight of solvent, it should be observed that the solvent content of the hardened portion of the adhesive mass down to a depth as indicated by the thickened section lines, has been reduced to substantially 30%, thus stiffening and rendering more cohesive this portion of the mass in the grooves.

Although in the particular example dealt with the weight of the solvent is 50% of the weight of the mass, with variations of the composition the percentage of solvent will also vary. In some cases this will be greater than 50% and in others less than 50%. In cases where a greater proportion of rubber than that given in the particular example, is used, a greater proportion of solvent also will be used to bring the mass in its wet state to the required consistency.

In Fig. 6, although the contacting surfaces of the transfer roller 28, porous backing 31 and main grooved roller 20 are circumferentially curved, they are shown rectilinear as owing to the great enlargement above full size (about twenty times) these contacting portions can be regarded for the short distance concerned as rectilinear. From Fig. 6 it will also be realised that the transfer roller 28 is proceeding in the direction of the arrow 36, the porous backing 31 in the direction of the arrow 37 and the main grooved roller 20 in the direction of the arrow 38, whilst the transfer roller 28 is pressed against the porous backing 31 in the direction of the arrow 39. Due to this pressure the portion of the porous backing 31 held between the transfer roller 28 and the ungrooved portion of the main grooved roller 20 is compressed and this is indicated by the reference C, Fig. 6. However, the portion of the porous backing coming between the transfer roller and the grooves is not compressed and when this uncompressed portion of the porous backing actually attains and passes through the transfer position and comes into coincidence with a groove 23, it projects into such groove. This is indicated at 40, Fig. 6, and the projection is sufficient to extend into the groove through the space left due to the shrinkage of the adhesive mass so that the surface of the porous backing is pressed on to the sufficiently adhesive surface of the adhesive mass for this latter to become adherent thereto. On the continuing rotation when the running surfaces of the two rollers diverge, as a result of this adhesion the patterned spread of adhesive is readily withdrawn from the grooves of the main roller 20, despite any slight tendency to "string" there may be in the position of, what may be termed, the plane of separation indicated by the arrows 41, Fig. 6.

In the result, the said patterned spread passes off as shown by 35, Fig. 1, whilst the grooves proceeding from the transfer position pass onwards towards the hopper 24 through the position shown by the arrow VII, Fig. 1, and exemplified in Fig. 7. From this last-mentioned figure it will be seen that the groove 23 has at the base thereof a small amount of the adhesive mass 42 which is still more or less in the wet state. This passes below the doctor blade 26 into the hopper 24 for the re-charging of the grooves. It has been found in practice that these small residues of adhesive mass passing back into the hopper are kept soft by the adhesive masses which re-charge the grooves and even after some 48 hours or more continuous working the grooves still carry out their functions without any of the adhesive mass hardening therein even at the base.

Fig. 9 shows to a scale well above full size a portion of the patterned spread of adhesive 35 on the backing 31, 44 being the adhesive and 45 the porous backing, and it should be emphasized that the pattern in practice has been uniformly consistent and clear cut.

To emphasise the fact that after the filled grooves emerge from beneath the hopper there should be a well-defined time period which can be represented by the arc to be travelled at a certain speed before the patterned spread of adhesive is transferred to the backing in order to enable the state of the adhesive mass carried in the grooves to change as hereinbefore set forth, Fig. 8 represents (in a view similar to Fig. 6) the condition that would exist were the transfer to be attempted in the position, say, represented by the arrow II of Fig. 1. In this case the adhesive mass is as shown in Fig. 2 in the wet condition and there is no entry of the backing into the groove. In the result, under the pressure in the direction of the arrow 39 there is a mere printing of the wet adhesive on to the backing which gives no definition and which leaves so little thickness of adhesive mass that it is insufficient to give adequate adhesion to the skin. A somewhat similar result would be obtained if the transfer position were at the arrow VI but the speed of the main roller 20 greatly increased.

To some extent Figs. 11 and 12 attempt to illustrate this and from Fig. 11, where 44 is the adhesive and 45 the porous backing, it will be seen that although it is desired the pattern should be as indicated more or less in dotted lines, yet the printed pattern is but a sprawl. Similarly, in Fig. 12, where the thicknesses are greatly exaggerated, it will be appreciated that the thickness of the adhesive is insufficient.

Figure 14:
Fig. 14 shows an end elevation of Fig. 13.

Figs. 13 and 14 show an example of a surgical dressing in the form of a continuous band having the patterned spread of adhesive applied by the method in accordance with the invention.

In carrying the method according to the invention into effect as particularly described in relation to Fig. 1, a roll of porous backing material, for example that known under the registered trademark Porvic, some 11" wide, co-operates with a roller of the same axial length to produce a roll of surgical dressing which is cut into strips of the width shown in Figs. 13 and 14.

Figure 15:
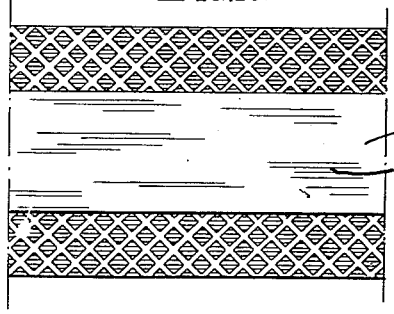
Fig. 15 shows a view similar to Fig. 13 but with the adhesive surface of the dressing carrying in an intermediate position a continuous medicated strip or pad of suitable material.
Figure 16:
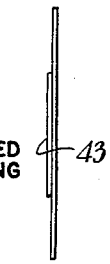
Fig. 16 shows an end view of Fig. 15.

In some cases, and as shown in Figs. 15 and 16, such a strip carries on its adhesive surface a continuous medicated dressing or pad 43 in a position intermediate its width.

Figure 17:
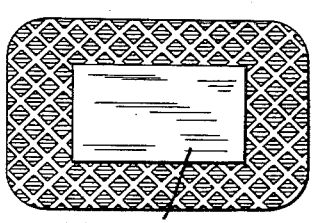
Figs. 17 and 18 show a plan of two examples of surgical dressings including medicated strips or pads, according to the present invention.
Figure 18:
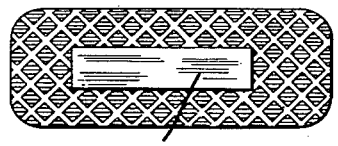

Further, the porous backing with the patterned spread applied according to the invention can be cut up into so-called "dressings" of various sizes such as illustrated in Figs. 17 and 18 which carry in a central position on the adhesive surface medicated pads or strips.

Figure 19:
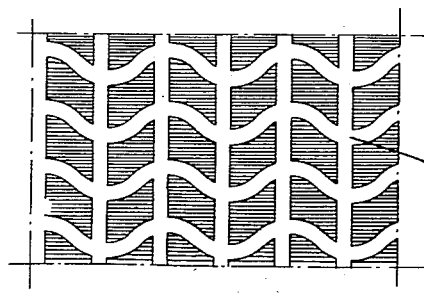
Fig. 19 is a view similar to Fig. 9 showing another example of the patterned spread, but to a larger scale.

In the example shown in Fig. 19, which is to a much larger scale than full size, the patterned spread shown by 46 in place of being rectilinear strips spaced apart at a desired pitch and crossing at right angles, is replaced by longitudinally extending wavy strips spaced at a desired pitch and transverse rectilinear strips spaced at a desired pitch crossing the wavy strips.

In some cases the patterned spread of adhesive may consist of words only or a combination of words with stripes. That is to say, the letters of a word are formed by an arrangement of grooves to receive the wet adhesive and these grooves are interconnected to give continuous runs and to leave ungrooved spaces in a uniform manner.

Whatever the arrangement of the patterned spread of adhesive, for adequate functioning it is preferred that some 50% of the area of the backing should be covered by the adhesive mass and some 50% uncovered. Of course, the invention is not limited to these percentages as somewhat more than 60% could be covered and somewhat less than 40% uncovered. Further, for strict medical and surgical purposes it is preferred that the width of any strip of adhesive on the backing should not exceed 0.25" and in this case the distance between the boundaries of any adjacent strips would also be substantially 0.25". Similarly, also for strict medical and surgical purposes, the minimum distance between the boundaries of any adjacent strips should not be less than 0.025" and in the majority of cases with this narrow uncovered portion of the backing the strips would have substantially the same width.

Highly successful results were obtained by the apparatus particularly described herein operating with the solvent-based adhesive also as herein described, but it should be understood that slight variations in the conditions can be compensated for, for example by adjusting the slow speed of rotation of the main grooved roller.

It should be further emphasised that by working at such a slow speed and at room temperature, with the particular roller having grooves 0.022" deep it is comparatively easy to determine the depth to which the adhesive mass fed into the grooves is affected by these two factors. Further, it will be understood, given the fact that the depth of the groove must of necessity be but slight and come between the normal limits of 0.010" and 0.060", the speed of travel to give the correct result for any particular adhesive mass in the wet state to pass through a certain distance from the charging to the transfer position, can be ascertained experimentally and subsequently utilised in the operation of the process.

Apart from the above, it should be pointed out that although in all cases the speed of the roller will be slow, yet it is determined by the actual diameter of the roller. In the example particularly described this is slightly more than 3" but if, for example, it were twice that diameter then the speed, although still slow, would be increased. Thus, it must be specifically understood herein that the term "slow speed" has wide limits, the highest "slow" speed of course being that determined by the maximum practical diameter of the main roller and the lowest "slow" speed being that determined by the minimum practical diameter of the main roller.

The invention is not limited to the precise details herein set forth, as these may be varied to suit particular requirements.

What I claim is:

1. In the manufacture of adhesive medical and surgical dressings of the type set forth, the method of applying a solvent-thinned pressure sensitive rubber based adhesive to the porous backing which utilises as a carrier for the patterned mass a slowly turning main roller the cylindrical curved surface of which has cut thereon shallow grooves in accordance with the pattern, to which grooves, while the roller is turning, the adhesive mass, at room temperature and in a wet state of low cohesiveness is fed at one zone, the charged grooves then passing through the major portion of rotary movement of said roller to a transfer position spaced a sufficient angular distance away from said adhesive feeding zone, to allow, by evaporation of some of the solvent therein, the greater part of the thickness of the adhesive mass in the grooves to change from the wet state to a readily adhesive stiffer and more cohesive condition but still to leave a residue of said mass in the wet state at the base of the grooves to readily permit displacement of said stiffer portion of said adhesive from said grooves, the transfer of the patterned adhesive mass to the porous backing being effected by a transfer roller having the same peripheral speed as but rotating in the opposite direction to the main grooved roller, the backing moving with and passing around the said transfer roller and being pressed thereby against the grooved surface of the main roller to contact with the exposed adhesive surface of the patterned adhesive and cohesive mass in the outer part of the grooves, to cause such mass to adhere to the surface of the backing and effect by the continued turning movement of the rollers the transfer of the patterned adhesive mass from the grooves to the backing by the easy separation of the stiffened portion of the adhesive mass of high cohesiveness in said grooves from the still-wet residue of the adhesive mass at the base of the grooves.

2. In the manufacture of adhesive medical and surgical dressings, the method of applying the solvent-thinned pressure sensitive rubber based adhesive to the porous backing as claimed in claim 1, in which the rate of rotation of the grooved roller and the distance of travel for the adhesive from the position where it emerges from the feeding zone to the transfer position is such that the solvent content of the stiffened portion of the adhesive mass to be transferred at the transfer position is substantially half the solvent content of the wet adhesive mass as it leaves the feeding zone.

3. In the manufacture of adhesive medical and surgical dressings, the method of applying the solvent-thinned pressure sensitive rubber based adhesive to the porous backing as claimed in claim 1, in which the said thinned adhesive includes substantially 50% by weight of solvent when in the wet state for feeding to the grooved main roller, and in which the speed of rotation and angular spacing between the feeding and transfer positions is such that the solvent content of the stiffened portion of the adhesive mass of high cohesiveness at the transfer position is reduced to substantially 30%.

4. A method of making surgical and medical adhesive dressings having a porous backing coated on one side with a patterned spread of solvent thinned pressure sensitive rubber based adhesive sufficient to give adequate adhesion to the skin, but leaving a multiplicity of uncoated areas for the escape of perspiration consisting in feeding solvent thinned pressure sensitive rubber based adhesive at room temperature to a slowly rotating roller so that the adhesive will be deposited in peripheral grooves therein by gravity, conveying said adhesive on said roller throughout the major portion of its rotary movement, continuously feeding said strip of porous material into transfer relationship with said adhesive in a zone adjacent the feeding point and after said adhesive has been conveyed and exposed to the atmosphere throughout the major portion of its travel before being transferred to said strip and thus permit the greater part of the thickness of the adhesive mass in the grooves to change from the wet state to a readily adhesive stiffer and more cohesive condition but still leave a residue of said mass in the wet state at the base of the grooves, said continuously fed strip being moved into engagement with the roller at substantially the same peripheral speed whereby said adhesive material will have its congealed portion presented to said backing in transfer relationship therewith.

5. In the manufacture of adhesive medical and surgical dressings of the type set forth, the method of applying a solvent-thinned pressure-sensitive rubber-based adhesive to the porous backing by a slowly rotating main roller having a peripheral speed of approximately 20 inches per minute, and a peripheral surface provided with grooves which are arranged in accordance with a pattern and which, during the rotation of the roller are fed at one zone with the adhesive highly diluted by a solvent and at room temperature whereupon the filled grooves, due to the slow rotation of the roller travel through the major portion of rotary movement of said roller to a transfer position which is arranged at such a distance from the adhesive feeding zone that, during this period of travel, a large proportion of the solvent present in the outer layers of the adhesive that fills the grooves will evaporate, these layers assuming a stiffer adhesive consistency while the adhesive at the base of the grooves still remains in a thinned state to readily permit displacement of said stiffer portion of said adhesive from said grooves, so that on the transference of the adhesive to the porous backing by being pressed on to the grooved roller by means of a transfer roller and carried around with it, the outer stiffened layers of the adhesive adhere thereto firmly and by the continued movement of the rollers are readily separated at this position from the thinned adhesive still remaining in the base of the grooves.

References Cited in the file of this patent

UNITED STATES PATENTS

| 2,116,289 | Shepherd | May 3, 1938 |
| 2,400,990 | Hawley | May 28, 1946 |
| 2,649,386 | Snowman | Aug. 18, 1953 |
| 2,729,193 | Scholl | Jan. 3, 1956 |
| 2,740,403 | Schueler | Apr. 3, 1956 |
| 2,750,942 | Robson | June 19, 1956 |

FOREIGN PATENTS

| 463 | Great Britain | A.D. 1904 |

OTHER REFERENCES

Crawford, Earl A.: "Gravure," June 1955.